(12) United States Patent
Hayashiguchi (10) Patent No.: US 9,231,466 B2
(45) Date of Patent: Jan. 5, 2016

(54) ELECTRONIC CIRCUIT

(71) Applicant: Masashi Hayashiguchi, Kyoto (JP)

(72) Inventor: Masashi Hayashiguchi, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 37 days.

(21) Appl. No.: 14/346,320

(22) PCT Filed: Sep. 20, 2012

(86) PCT No.: PCT/JP2012/074094
§ 371 (c)(1),
(2) Date: Mar. 20, 2014

(87) PCT Pub. No.: WO2013/042741
PCT Pub. Date: Mar. 28, 2013

(65) Prior Publication Data
US 2014/0226376 A1    Aug. 14, 2014

(30) Foreign Application Priority Data

Sep. 20, 2011  (JP) ................. 2011-204883

(51) Int. Cl.
*H02M 1/34* (2007.01)
*H02M 7/00* (2006.01)
*H02M 7/5387* (2007.01)
*H02M 7/537* (2006.01)

(52) U.S. Cl.
CPC .............. *H02M 1/34* (2013.01); *H02M 7/003* (2013.01); *H02M 7/537* (2013.01); *H02M 7/5387* (2013.01); *H02M 2001/346* (2013.01); *H02M 2001/348* (2013.01); *Y02B 70/1491* (2013.01)

(58) Field of Classification Search
CPC ..... H02M 1/32; H02M 7/148; H02M 7/5387; H02M 7/1227; H02M 7/537; H02M 7/003; H02M 7/538; H02M 1/34
USPC .......... 363/55, 56.01, 56.02, 56.03, 131, 132, 363/56.12
See application file for complete search history.

(56) References Cited

U.S. PATENT DOCUMENTS

| 4,772,994 | A | * | 9/1988 | Harada et al. ............ 363/8 |
| 5,132,896 | A | | 7/1992 | Nishizawa et al. |
| 5,202,820 | A | * | 4/1993 | Miller et al. ............ 363/56.02 |
| 5,214,575 | A | * | 5/1993 | Sugishima et al. ........... 363/37 |
| 5,274,541 | A | * | 12/1993 | Kimura et al. ............ 363/56.02 |

(Continued)

FOREIGN PATENT DOCUMENTS

| JP | H03-285570 A | 12/1991 |
| JP | H07-122708 A | 5/1995 |

(Continued)

*Primary Examiner* — Adolf Berhane
(74) *Attorney, Agent, or Firm* — Rabin & Berdo, P.C.

(57) ABSTRACT

The invention provides an electronic circuit capable of reducing surge voltage while reducing switching loss when a MOSFET is turned off. A capacitor (91) is connected between apart closer to a first power source terminal (31) of a U-phase module (3) in a bus bar (61*a*) and a part closer to a second power source terminal (32) of the U-phase module (3) in a bus bar (64*a*). A capacitor (92) is connected between apart closer to a first power source terminal (41) of a V-phase module (4) in a bus bar (62) and a part closer to a second power source terminal (42) of the V-phase module (4) in a bus bar (65). A capacitor (93) is connected between a part closer to a first power source terminal (51) of a W-phase module (5) in a bus bar (63) and a part closer to a second power source terminal (52) of the W-phase module (5) in a bus bar (66).

16 Claims, 5 Drawing Sheets

(56) References Cited

U.S. PATENT DOCUMENTS

| | | |
|---|---|---|
| 5,543,659 A | 8/1996 | Hosen |
| 6,459,598 B1* | 10/2002 | Yamamoto et al. ........ 363/56.01 |
| 8,102,687 B2* | 1/2012 | Takasu et al. ................. 363/132 |
| 8,406,024 B2* | 3/2013 | Nakamura .................... 363/131 |
| 8,659,920 B2* | 2/2014 | Yamaguchi et al. ....... 363/56.02 |
| 2008/0030913 A1 | 2/2008 | Shirakawa et al. |
| 2010/0045113 A1* | 2/2010 | Hishikawa et al. ............. 307/77 |
| 2010/0328975 A1 | 12/2010 | Hibino et al. |
| 2012/0007533 A1* | 1/2012 | Ogawa et al. ................. 318/503 |
| 2013/0207712 A1* | 8/2013 | Suzuki et al. ................. 327/379 |

FOREIGN PATENT DOCUMENTS

| | | |
|---|---|---|
| JP | H08-8394 A | 1/1996 |
| JP | 2004-152861 A | 5/2004 |
| JP | 2008-029052 A | 2/2008 |
| JP | 2009-219268 A | 9/2009 |

* cited by examiner

ELECTRONIC CIRCUIT

TECHNICAL FIELD

The present invention relates to an electronic circuit, such as a three-phase inverter circuit or an H bridge circuit.

BACKGROUND ART

A MOSFET (Metal-Oxide-Semiconductor Field Effect Transistor), such as a DMOSFET (Double Diffused MOSFET), or an IGBT (Insulated Gate Bipolar Transistor) is used as a switching element of an electronic circuit, such as a three-phase inverter circuit or an H bridge circuit. A gate drive signal is supplied to a gate terminal of the MOSFET or of the IGBT through a gate resistor.

Figure 5:
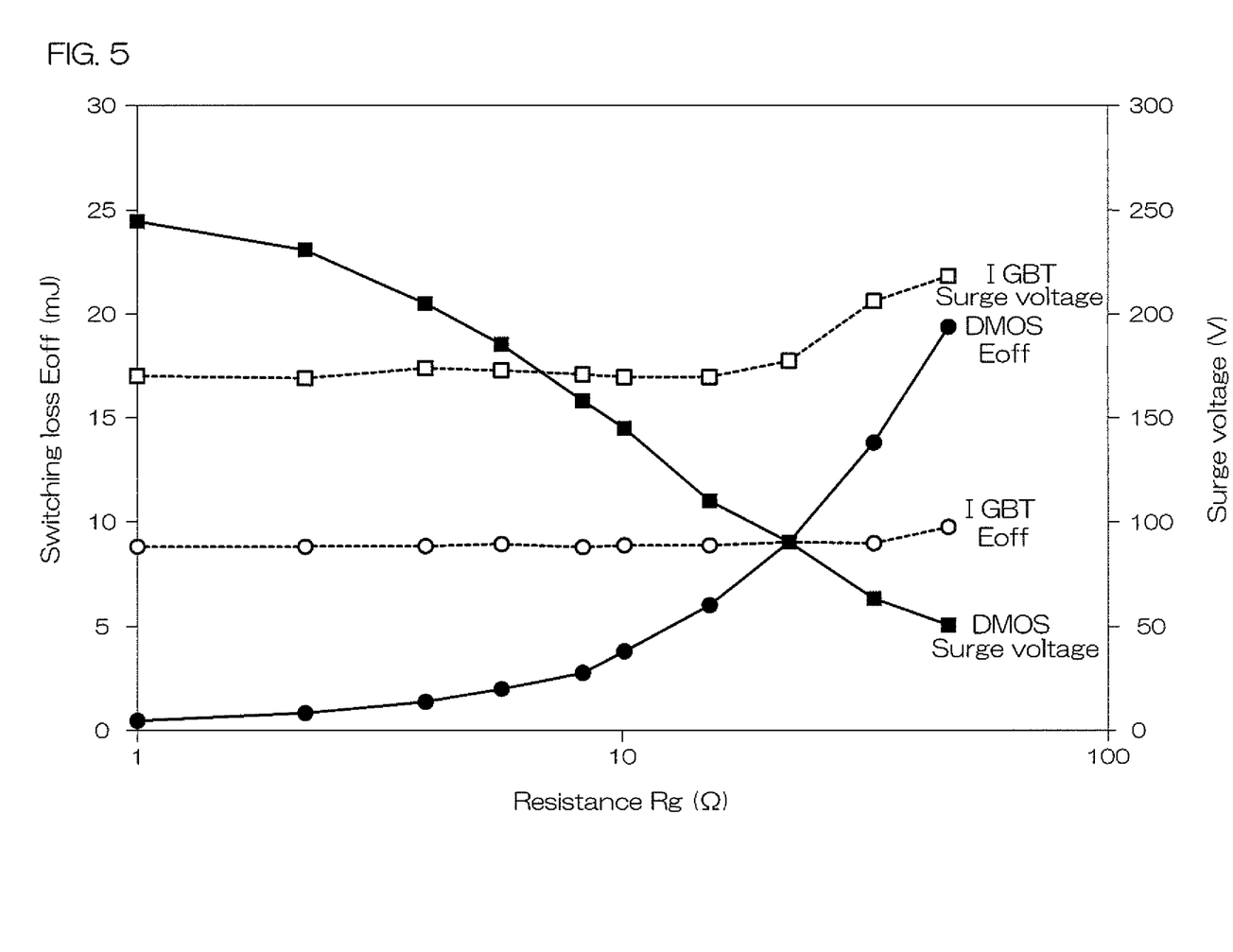
FIG. 5 is a graph showing a relationship among gate resistance, switching loss caused when a DMOSFET is turned off, and surge voltage and showing a relationship among gate resistance, switching loss caused when an IGBT is turned off, and surge voltage.

FIG. 5 is a graph showing a relationship among gate resistance, switching loss (DMOS Eoff) caused when a DMOSFET is turned off, and surge voltage and showing a relationship among gate resistance, switching loss (IGBT Eoff) caused when an IGBT is turned off, and surge voltage.

In the IGBT, the gate resistance dependency of switching loss at the turn-off time is low. Additionally, in the IGBT, the amount of increase of the surge voltage is small with respect to an increase of the gate resistance. On the other hand, in the DMOSFET, the switching loss at the turn-off time can be made much smaller by reducing the gate resistance than in the IGBT. However, in the DMOSFET, if the gate resistance is reduced, the rate of change di/dt of a drain current at the turn-off time will become great, and therefore a great surge voltage will be generated.

Figure 4:
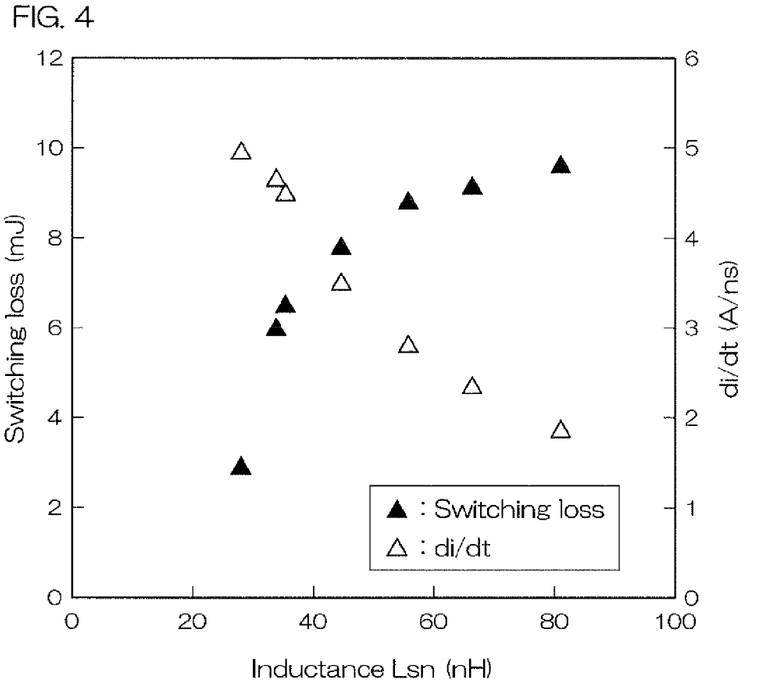
FIG. 4 is a graph showing measurement results of the switching loss (mJ) with respect to samples "a" to "g" when a MOSFET is turned off and the rate of change di/dt (A/ns) of a drain current.

As shown in FIG. 4, Patent Literature 1 discloses an arrangement in which, in a three-phase inverter circuit including six IGBTs, a snubber circuit is connected between a single DC input terminal P to which a collector of high-side IGBTs equivalent to three phases is connected and a single DC input terminal N to which an emitter of low-side IGBTs equivalent to three phases is connected, in order to restrain a surge voltage.

CITATION LIST

Patent Literature

PTL 1: Japanese Unexamined Patent Publication No. H7-122708

SUMMARY OF INVENTION

Technical Problem

An object of the present invention is to provide an electronic circuit capable of reducing the switching loss and capable of reducing the surge voltage when a MOSFET is turned off.

Solution to Problem

The electronic circuit of the present invention is an electronic circuit having a plurality of series circuits each of which has two MOSFETs connected in series in which a first power supply terminal is connected to one end of each of the series circuits and in which a second power supply terminal is connected to an opposite end of each of the series circuits, and the electronic circuit is composed of a first bus bar one end of which is connected to each of the first power supply terminals and that forms a part of an external electric wire to connect the first power supply terminal to one terminal of a power source, a second bus bar one end of which is connected to each of the second power supply terminals and that forms apart of an external electric wire to connect the second power supply terminal to an opposite terminal of the power source, and a snubber circuit that is provided in each of the series circuits and that is connected between the first bus bar connected to the series circuit through the first power supply terminal and the second bus bar connected to the series circuit through the second power supply terminal. In the electronic circuit, one end of each of the snubber circuits is connected to a part of the corresponding first bus bar closer to the first power supply terminal, whereas an opposite end of each of the snubber circuits is connected to a part of the corresponding second bus bar closer to the second power supply terminal.

The present invention includes a snubber circuit that is provided in each series circuit and that is connected between the first bus bar connected to the series circuit through the first power supply terminal and the second bus bar connected to the series circuit through the second power supply terminal, and therefore the surge voltage applied to a MOSFET when the MOSFET is turned off can be reduced.

Additionally, one end of each snubber circuit is connected to a part of the corresponding first bus bar closer to the first power supply terminal, and therefore the inductance of an interval part between the connection position of the snubber circuit and the first power supply terminal in the first bus bar can be reduced. Additionally, an opposite end of each snubber circuit is connected to a part of the corresponding second bus bar closer to the second power supply terminal, and therefore the inductance of an interval part between the connection position of the snubber circuit and the second power supply terminal in the second bus bar can be reduced. As a result, when the MOSFET is turned off, an inductance (excluding inductances by which energy stored by the snubber circuits is absorbed) that causes the generation of the surge voltage applied to the MOSFET can be reduced.

When the connection position of each snubber circuit with respect to a bus bar is changed and when gate resistance is changed so that the surge voltage applied to a MOSFET that has been turned off becomes constant, switching loss caused when the MOSFET is turned off becomes smaller in proportion to a reduction of the inductance that causes the generation of the surge voltage applied to the MOSFET. In the present invention, the inductance can be reduced, and therefore the switching loss at the turn-off time of the MOSFET can be reduced, and the surge voltage can be reduced.

In one embodiment of the present invention, in a combination of an arbitrary one of the series circuits, the first and second power supply terminals connected to both ends of the arbitrary one, the first and second bus bars connected thereto, and the snubber circuit connected therebetween, a sum of an inductance of an interval part between a connection point with one end of the snubber circuit and the first power supply terminal in the first bus bar, an inductance of an interval part between a connection point with an opposite end of the snubber circuit and the second power supply terminal in the second bus bar, and an inductance of the series circuit between the first power supply terminal and the second power supply terminal is 40 nH or less.

In this arrangement, when either one of the two MOSFETs included in the series circuit in the combination is turned off, the inductance that causes the generation of the surge voltage applied to the MOSFET that has been turned off can be reduced to be 40 nH or less, and therefore the switching loss at the turn-off time of the MOSFET can be reduced, and the surge voltage can be reduced.

In one embodiment of the present invention, one end of the snubber circuit is connected between one end of the first bus bar closer to the first power supply terminal and a second position of the first bus bar located at a first predetermined distance with respect to a first position of the first bus bar nearest to an outer end of the first power supply terminal in a direction receding from the first power supply terminal. The first predetermined distance is set so that an inductance of a part of the first bus bar from the first position to the second position becomes equal to 6.25 nH or less. An opposite end of the snubber circuit is connected between one end of the second bus bar closer to the second power supply terminal and a fourth position located at a second predetermined distance with respect to a third position nearest to an outer end of the second power supply terminal in a direction receding from the second power supply terminal. The second predetermined distance is set so that an inductance of a part of the second bus bar from the third position to the fourth position becomes equal to 6.25 nH or less.

In this arrangement, the inductance that causes the generation of the surge voltage applied to the MOSFET that has been turned off can be reduced, and therefore the switching loss at the turn-off time of the MOSFET can be reduced, and the surge voltage can be reduced.

In one embodiment of the present invention, each of the MOSFETs is a SiC-MOSFET made of a semiconductor material composed chiefly of SiC.

DESCRIPTION OF EMBODIMENTS

An embodiment of the present invention will be hereinafter described in detail with reference to the accompanying drawings.

Figure 1:
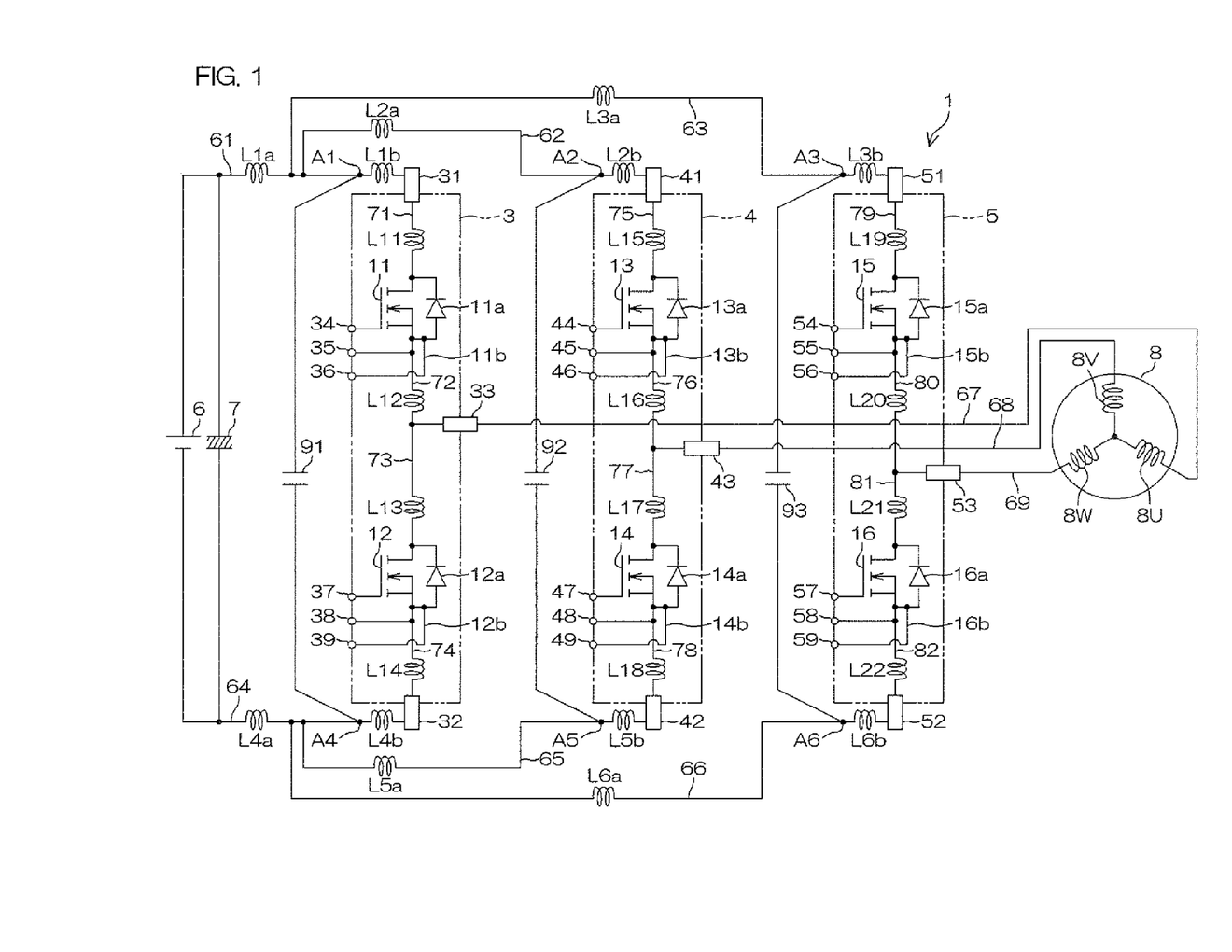
FIG. 1 is an electric circuit diagram showing a three-phase inverter circuit according to an embodiment of the present invention.

FIG. 1 is an electric circuit diagram showing a three-phase inverter circuit according to an embodiment of the present invention.

This three-phase inverter circuit 1 is a circuit to drive a three-phase brushless motor 8 (hereinafter, referred to as an "electric motor"). The electric motor 8 is composed of a stator that has a U-phase field coil 8U, a V-phase field coil 8V, and a W-phase field coil 8W and a rotor to which a permanent magnet is fixed.

The three-phase inverter circuit 1 includes a U-phase module 3 that is used for a U phase, a V-phase module 4 that is used for a V phase, and a W-phase module 5 that is used for a W phase. The U-phase module 3 is composed of a first power supply terminal (P terminal) 31, a second power supply terminal (N terminal) 32, an output terminal (OUT terminal) 33, two gate terminals 34 and 37, two source terminals 35 and 38, and two source sense terminals 36 and 39.

The V-phase module 4 is composed of a first power supply terminal (P terminal) 41, a second power supply terminal (N terminal) 42, an output terminal (OUT terminal) 43, two gate terminals 44 and 47, two source terminals 45 and 48, and two source sense terminals 46 and 49. The W-phase module 5 is composed of a first power supply terminal (P terminal) 51, a second power supply terminal (N terminal) 52, an output terminal (OUT terminal) 53, two gate terminals 54 and 57, two source terminals 55 and 58, and two source sense terminals 56 and 59.

Each of the first power supply terminals 31, 41, and 51 of the modules 3, 4, and 5 is connected to a positive terminal of a power source (DC power source) 6 through an external electric wire. More specifically, the first power supply terminal 31 of the U-phase module 3 is connected to the positive terminal of the power source 6 through a first external electric wire 61. The first power supply terminal 41 of the V-phase module 4 is connected to an intermediate part of the first external electric wire 61 through a second external electric wire 62. The first power supply terminal 51 of the W-phase module 5 is connected to the intermediate part of the first external electric wire 61 through a third external electric wire 63.

Each of the second power supply terminals 32, 42, and 52 of the modules 3, 4, and 5 is connected to a negative terminal of the power source 6 through an external electric wire. More specifically, the second power supply terminal 32 of the U-phase module 3 is connected to the negative terminal of the power source 6 through a fourth external electric wire 64. The second power supply terminal 42 of the V-phase module 4 is connected to an intermediate part of the fourth external electric wire 64 through a fifth external electric wire 65. The second power supply terminal 52 of the W-phase module 5 is connected to the intermediate part of the fourth external electric wire 64 through a sixth external electric wire 66. An inductance parasitizes each of the external electric wires 61 to 66.

A smoothing capacitor 7 is connected to the power source 6 in parallel. The output terminals 33, 43, and 53 of the modules 3, 4, and 5 are connected to a U-phase field winding 8U, a V-phase field winding 8V, and a W-phase field winding 8W of the electric motor 8 through seventh, eighth, and ninth external electric wires 67, 68, and 69, respectively. A control unit (not shown) is connected to each of the gate terminals 34, 37, 44, 47, 54, 57 and to each of the source sense terminals 36, 39, 46, 49, 56, and 59 of the modules 3, 4, and 5. The control unit allows a gate drive signal to be supplied to each of the gate terminals 34, 37, 44, 47, 54, and 57 of the modules 3, 4, and 5 through gate resistors (not shown).

The U-phase module 3 includes a high-side first MOSFET 11 and a low-side second MOSFET 12 connected in series thereto. The MOSFETs 11 and 12 have a built-in first PN junction diode (body diode) 11a and a built-in second PN junction diode 12a, respectively. Anodes of the PN junction diodes 11a and 12a are electrically connected to corresponding sources of the MOSFETs 11 and 12, respectively, and cathodes thereof are electrically connected to corresponding drains of the MOSFETs 11 and 12, respectively. The MOSFETs 11 and 12 are provided with current detecting portions 11b and 12b, respectively.

The drain of the first MOSFET 11 is connected to the first power supply terminal 31 of the U-phase module 3 through a connection metal member 71. The source of the first MOSFET 11 is connected to the output terminal 33 of the U-phase module 3 through a connection metal member 72. Inductances L11 and L12 parasitize the connection metal members 71 and 72, respectively. The source of the first MOSFET 11 is further connected to the source terminal 35 of the U-phase module 3. The current detecting portion 11b is connected to the source sense terminal 36 of the U-phase module 3. The gate of the first MOSFET 11 is connected to the gate terminal 34 of the U-phase module 3.

The drain of the second MOSFET 12 is connected to the output terminal 33 of the U-phase module 3 through a connection metal member 73. The source of the second MOSFET 12 is connected to the second power supply terminal 32 of the U-phase module 3 through a connection metal member 74. Inductances L13 and L14 parasitize the connection metal members 73 and 74, respectively. The source of the second MOSFET 12 is further connected to the source terminal 38 of the U-phase module 3. The current detecting portion 12b is connected to the source sense terminal 39 of the U-phase module 3. The gate of the second MOSFET 12 is connected to the gate terminal 37 of the U-phase module 3.

The V-phase module 4 includes a high-side third MOSFET 13 and a low-side fourth MOSFET 14 connected in series thereto. The MOSFETs 13 and 14 have built-in third and fourth PN junction diodes (body diodes) 13a and 14a, respectively. Anodes of the PN junction diodes 13a and 14a are electrically connected to corresponding sources of the MOSFETs 13 and 14, respectively, and cathodes thereof are electrically connected to corresponding drains of the MOSFETs 13 and 14, respectively. The MOSFETs 13 and 14 are provided with current detecting portions 13b and 14b, respectively.

The drain of the third MOSFET 13 is connected to the first power supply terminal 41 of the V-phase module 4 through a connection metal member 75. The source of the third MOSFET 13 is connected to the output terminal 43 of the V-phase module 4 through a connection metal member 76. Inductances L15 and L16 parasitize the connection metal members 75 and 76, respectively. The source of the third MOSFET 13 is further connected to the source terminal 45 of the V-phase module 4. The current detecting portion 13b is connected to the source sense terminal 46 of the V-phase module 4. The gate of the third MOSFET 13 is connected to the gate terminal 44 of the V-phase module 4.

The drain of the fourth MOSFET 14 is connected to the output terminal 43 of the V-phase module 4 through a connection metal member 77. The source of the fourth MOSFET 14 is connected to the second power supply terminal 42 of the V-phase module 4 through a connection metal member 78. Inductances L17 and L18 parasitize the connection metal members 77 and 78, respectively. The source of the fourth MOSFET 14 is further connected to the source terminal 48 of the V-phase module 4. The current detecting portion 14b is connected to the source sense terminal 49 of the V-phase module 4. The gate of the fourth MOSFET 14 is connected to the gate terminal 47 of the V-phase module 4.

The W-phase module 5 includes a high-side fifth MOSFET 15 and a low-side sixth MOSFET 16 connected in series thereto. The MOSFETs 15 and 16 have built-in fifth and sixth PN junction diodes (body diodes) 15a and 16a, respectively. Anodes of the PN junction diodes 15a and 16a are electrically connected to corresponding sources of the MOSFETs 15 and 16, respectively, and cathodes thereof are electrically connected to corresponding drains of the MOSFETs 15 and 16, respectively. The MOSFETs 15 and 16 are provided with current detecting portions 15b and 16b, respectively.

The drain of the fifth MOSFET 15 is connected to the first power supply terminal 51 of the W-phase module 5 through a connection metal member 79. The source of the fifth MOSFET 15 is connected to the output terminal 53 of the W-phase module 5 through a connection metal member 80. Inductances L19 and L20 parasitize the connection metal members 79 and 80, respectively. The source of the fifth MOSFET 15 is further connected to the source terminal 55 of the W-phase module 5. The current detecting portion 15b is connected to the source sense terminal 56 of the W-phase module 5. The gate of the fifth MOSFET 15 is connected to the gate terminal 54 of the W-phase module 5.

The drain of the sixth MOSFET 16 is connected to the output terminal 53 of the W-phase module 5 through a connection metal member 81. The source of the sixth MOSFET 16 is connected to the second power supply terminal 52 of the W-phase module 5 through a connection metal member 82. Inductances L21 and L22 parasitize the connection metal members 81 and 82, respectively. The source of the sixth MOSFET 16 is further connected to the source terminal 58 of the W-phase module 5. The current detecting portion 16b is connected to the source sense terminal 59 of the W-phase module 5. The gate of the sixth MOSFET 16 is connected to the gate terminal 57 of the W-phase module 5.

For example, each of the first to sixth MOSFETs 11 to 16 is a SiC-MOSFET, such as a SiC-DMOSFET, that uses SiC (silicon carbide) as a semiconductor material, which is one example of a compound semiconductor.

A snubber circuit composed of a capacitor 91 is connected between a part of the first external electric wire 61 closer to the first power supply terminal 31 of the U-phase module 3 and a part of the fourth external electric wire 64 closer to the second power supply terminal 32 of the U-phase module 3.

Let the connection point between the first external electric wire 61 and the capacitor 91 be a connection point A1. An inductance L1a parasitizes an interval part between a positive terminal of the power source 6 and the connection point A1 in the first external electric wire 61, and an inductance L1b parasitizes an interval part between the connection point A1 and the first power supply terminal 31 in the first external electric wire 61. Let the connection point between the fourth external electric wire 64 and the capacitor 91 be a connection point A4. An inductance L4a parasitizes an interval part between a negative terminal of the power source 6 and the connection point A4 in the fourth external electric wire 64, and an inductance L4b parasitizes an interval part between the connection point A4 and the second power supply terminal 32 in the fourth external electric wire 64.

A snubber circuit composed of a capacitor 92 is connected between a part of the second external electric wire 62 closer to the first power supply terminal 41 of the V-phase module 4 and a part of the fifth external electric wire 65 closer to the second power supply terminal 42 of the V-phase module 4.

Let the connection point between the second external electric wire 62 and the capacitor 92 be a connection point A2. An inductance L2b parasitizes an interval part between the connection point A2 and the first power supply terminal 41 in the second external electric wire 62, and an inductance L2a parasitizes the remaining part. Let the connection point between the fifth external electric wire 65 and the capacitor 92 be a connection point A5. An inductance L5b parasitizes an interval part between the connection point A5 and the second power supply terminal 42 in the fifth external electric wire 65, and an inductance L5a parasitizes the remaining part.

A snubber circuit composed of a capacitor 93 is connected between a part of the third external electric wire 63 closer to the first power supply terminal 51 of the W-phase module 5 and a part of the sixth external electric wire 66 closer to the second power supply terminal 52 of the W-phase module 5.

Let the connection point between the third external electric wire 63 and the capacitor 93 be a connection point A3. An inductance L3b parasitizes an interval part between the connection point A3 and the first power supply terminal 51 in the third external electric wire 63, and an inductance L1a parasitizes the remaining part. Let the connection point between the sixth external electric wire 66 and the capacitor 93 be a connection point A6. An inductance L6b parasitizes an interval part between the connection point A6 and the second power supply terminal 52 in the sixth external electric wire 66, and an inductance L6a parasitizes the remaining part. The capacitors (snubber circuits) 91 to 93 are provided to restrain the surge voltage.

Figure 2:
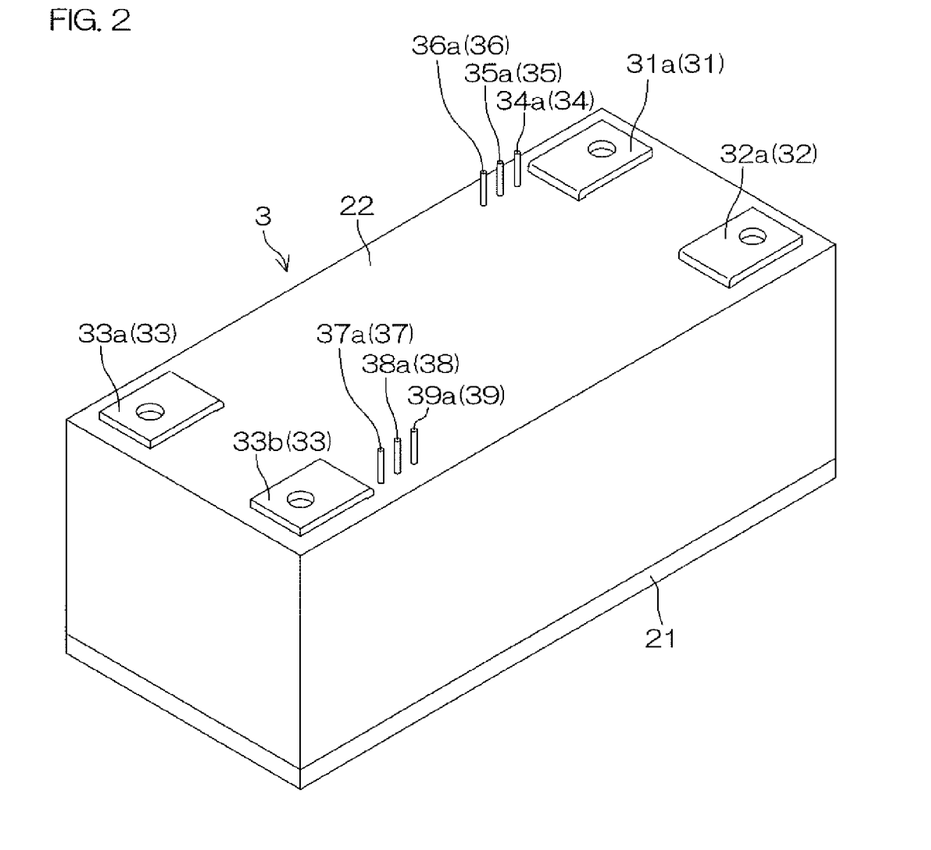
FIG. 2 is a pictorial perspective view showing the exterior of a U-phase module, which is used for a U phase, of FIG. 1.

FIG. 2 is a pictorial perspective view showing the exterior of the U-phase module 3 of FIG. 1.

The U-phase module 3 includes a heat dissipation plate 21, a substrate (not shown) that is fixed to the heat dissipation plate 21 and to which the MOSFETs 11 and 12, base ends of the terminals 31 to 39, etc., are fixed, and a case 22 that is fixed to one surface of the heat dissipation plate 21 and that contains the substrate. The case 22 is formed in a substantially rectangular shape when viewed planarly. The output terminal 33 of the module 3 forks in two directions within the case 22, and has two flat branch portions. Forward ends 33a and 33b of the branch portions pass through the upper surface of the case 22, and are exposed outwardly from the case 22. These forward ends 33a and 33b are disposed in a state along the upper surface of the case 22 at both sides of one end of the upper surface of the case 22, respectively. The first power supply terminal 31 and the second power supply terminal 32 of the module 3 are flat, and their forward ends 31a and 32a pass through the upper surface of the case 22, and are exposed outwardly from the case 22. These forward ends 31a and 32a are disposed in a state along the upper surface of the case 22 at both sides of the other end of the upper surface of the case 22, respectively.

The gate terminal 34, which is one of the two gate terminals, the source terminal 35, which is one of the two source terminals, and the source sense terminal 36, which is one of the two source sense terminals, of the module 3 are rod-shaped terminals, and their forward ends 34a, 35a, and 36a pass through the upper surface of the case 22, and protrude outwardly from the case 22. These forward ends 34a, 35a, and 36a are disposed adjacently to the forward end 31a of the first power supply terminal 31 in the upper surface of the case 22. The other gate terminal 37, the other source terminal 38, and the other source sense terminal 39 of the module 3 are rod-shaped terminals, and their forward ends 37a, 38a, and 39a pass through the upper surface of the case 22, and protrude outwardly from the case 22. These forward ends 37a, 38a, and 39a are disposed adjacently to the forward end 33b, which is one of the two forward ends, of the output terminal 33 in the upper surface of the case 22.

The V-phase module 4 and the W-phase module 5 have the same exterior and the same structure as those of the U-phase module 3, and therefore a description of these exterior and structure is omitted.

Figure 3:
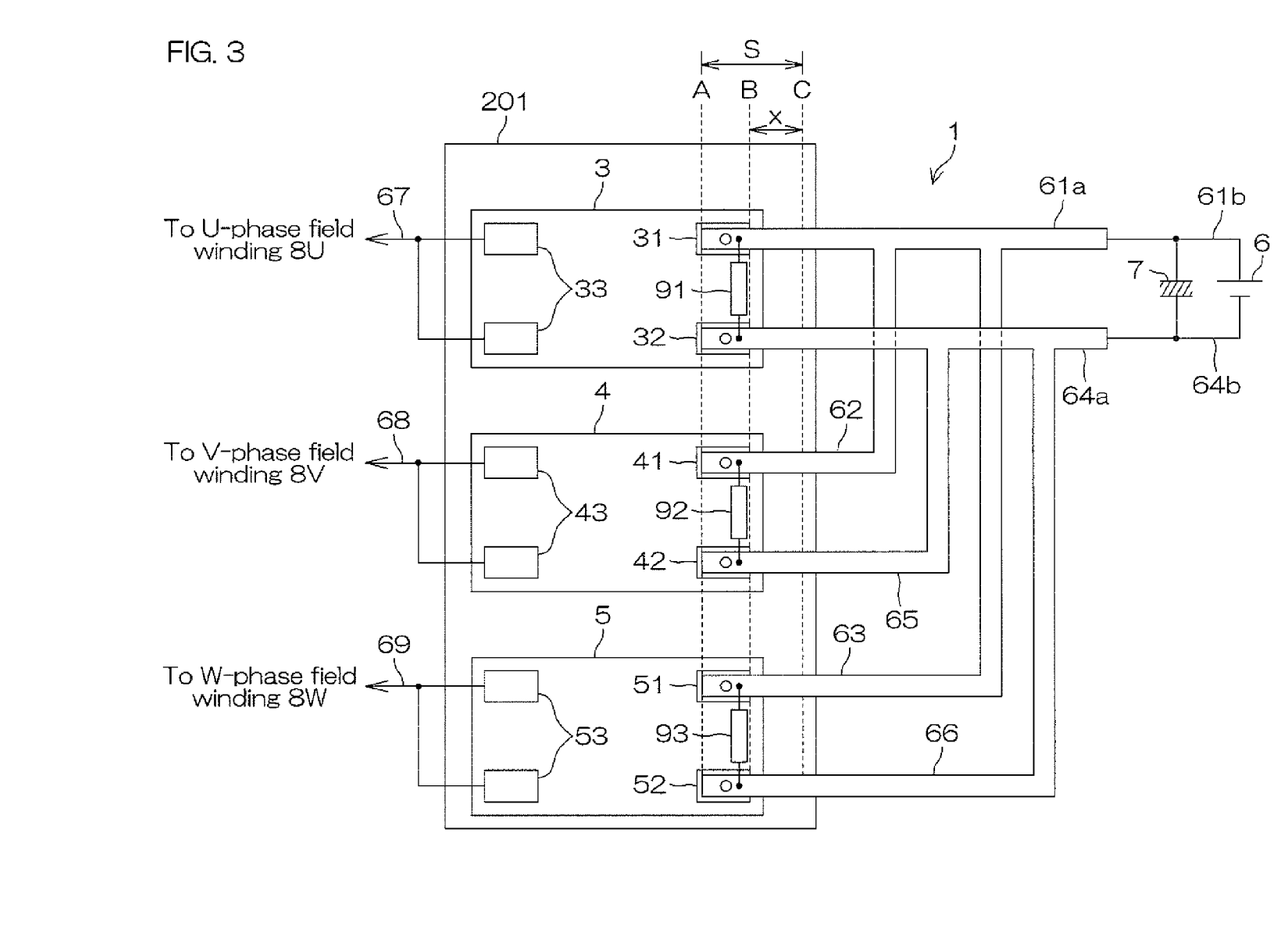
FIG. 3 is a plan view chiefly showing external electric wires connected to power supply terminals of modules and snubber circuits connected thereto.

FIG. 3 is a plan view chiefly showing external electric wires connected to the power supply terminals 31, 32, 41, 42, 51, and 52 of the modules 2, 3, and 4 and showing snubber circuits connected thereto.

Each of the modules 3, 4, and 5 is attached to a cooling plate 201. The output terminal 33 of the U-phase module 3 is connected to the U-phase field winding 8U of the electric motor 8 through the external electric wire 67. The output terminal 43 of the V-phase module 4 is connected to the V-phase field winding 8V of the electric motor 8 through the external electric wire 68. The output terminal 53 of the W-phase module 5 is connected to the W-phase field winding 8W of the electric motor 8 through the external electric wire 69.

One end of a bus bar 61a is screwed to the first power supply terminal 31 of the U-phase module 3. The other end of the bus bar 61a is connected to the positive terminal of the power source 6 through a connection line 61b. The first external electric wire 61 of FIG. 1 consists of the bus bar 61a and the connection line 61b. One end of a bus bar 64a is screwed to the second power supply terminal 32 of the U-phase module 3. The other end of the bus bar 64a is connected to the negative terminal of the power source 6 through a connection line 64b. The fourth external electric wire 64 of FIG. 1 consists of the bus bar 64a and the connection line 64b. The smoothing capacitor 7 is connected to the power source 6 in parallel.

One end of a bus bar 62 (corresponding to the second external electric wire 62 of FIG. 1) is screwed to the first power supply terminal 41 of the V-phase module 4. The other end of the bus bar 62 is connected to an intermediate part of the bus bar 61a. One end of a bus bar 65 (corresponding to the fifth external electric wire 65 of FIG. 1) is screwed to the second power supply terminal 42 of the V-phase module 4. The other end of the bus bar 65 is connected to an intermediate part of the bus bar 64a.

One end of a bus bar 63 (corresponding to the third external electric wire 63 of FIG. 1) is screwed to the first power supply terminal 51 of the W-phase module 5. The other end of the bus bar 63 is connected to the intermediate part of the bus bar 61a. One end of a bus bar 66 (corresponding to the sixth external electric wire 66 of FIG. 1) is screwed to the second power supply terminal 52 of the W-phase module 5. The other end of the bus bar 66 is connected to the intermediate part of the bus bar 64a.

A capacitor 91 is connected between a part of the bus bar 61a closer to the first power supply terminal 31 and a part of the bus bar 64a closer to the second power supply terminal 32. A capacitor 92 is connected between a part of the bus bar 62 closer to the first power supply terminal 41 and a part of the bus bar 65 closer to the second power supply terminal 42. A capacitor 93 is connected between a part of the bus bar 63 closer to the first power supply terminal 51 and a part of the bus bar 66 closer to the second power supply terminal 52.

Preferably, one end of each of the capacitors 91, 92, and 93 is connected (to an A-to-C area S) between one end (position A) of each of the corresponding bus bars 61a, 62, and 63 closer to the first power supply terminals 31, 41, and 51 and a position (position C) located at a predetermined distance x in a direction receding from the first power supply terminals 31, 41, and 51 with respect to a position (position B) of each of the corresponding bus bars 61a, 62, and 63 nearest to an outer end of each of the first power supply terminals 31, 41, and 51.

Likewise, preferably, the other end of each of the capacitors 91, 92, and 93 is connected (to an A-to-C area S) between one end (position A) of each of the corresponding bus bars 64a, 65, and 66 closer to the second power supply terminals 32, 42, and 52 and a position (position C) located at a predetermined distance x in a direction receding from the second power supply terminals 32, 42, and 52 with respect to a position (position B) of each of the corresponding bus bars 64a, 65, and 66 nearest to an outer end of each of the second power supply terminals 32, 42, and 52.

Preferably, the predetermined distance x is set so that the inductance of the part from position B to position C in each of the bus bars 61a, 62, 63, 64a, 65, and 66 is 6.25 (nH) or less. This predetermination of the distance x makes it possible to reduce both the switching loss caused when a MOSFET is turned off and the surge voltage applied to this MOSFET as described later.

Preferably, the two bus bars 61a and 64a connected to the two power supply terminals 31 and 32 of the module 3 are disposed such that their intermediate parts coincide with each other in the up-down direction when viewed planarly so that their inductance components are offset. Likewise, preferably, the two bus bars 62 and 65 connected to the two power supply terminals 41 and 42 of the module 4 are disposed such that their intermediate parts coincide with each other in the up-down direction when viewed planarly. Likewise, preferably, the two bus bars 63 and 66 connected to the two power supply terminals 51 and 52 of the module 5 are disposed such that their intermediate parts coincide with each other in the up-down direction when viewed planarly.

Referring again to FIG. 1, for example, when the high-side MOSFET 11 in the U-phase module 3 and the low-side MOSFET 14 in the V-phase module 4 are turned on among the MOSFETs 11 to 16, an electric current flows from the positive terminal of the power source 6 to the negative terminal of the power source 6 through the first external electric wire 61, the first power supply terminal 31, the connection metal member 71, the MOSFET 11, the connection metal member 72, the output terminal 33, the seventh external electric wire 67, the U-phase field winding 8U and the V-phase field winding 8V of the electric motor 8, the eighth external electric wire 68, the output terminal 43, the connection metal member 77, the MOSFET 14, the connection metal member 78, the second power supply terminal 42, the fifth external electric wire 65, and the fourth external electric wire 64.

When the high-side MOSFET 11 in the U-phase module 3 is turned off from this state, a load current flows back through a closed circuit that includes the output terminal 33, the seventh external electric wire 67, the U-phase field winding 8U and the V-phase field winding 8V of the electric motor 8, the eighth external electric wire 68, the output terminal 43, the connection metal member 77, the MOSFET 14, the connection metal member 78, the second power supply terminal 42, the fifth external electric wire 65, the interval part between a connection point with the fifth external electric wire 65 and the second output terminal 32 in the fourth external electric wire 64, the second output terminal 32, the connection metal member 74, the PN junction diode 12a, and the connection metal member 73.

In this example, a surge voltage (Ls·di/dt) depending on the electric current rate of change (di/dt) of the drain current of the MOSFET 11 and depending on the predetermined parasitic inductance Ls of the circuit wiring is applied to the MOSFET 11.

If the snubber circuits 91 to 93 are not provided, the inductance Lst that causes the generation of the surge voltage applied to the MOSFET 11 becomes equal to the sum of an inductance (part of L4a) between the connection point with the fifth wiring line 65 and the negative terminal of the power source 6 in the fourth external electric wire 64, an inductance (L1a+L1b) of the first external electric wire 61, inductances L11 and L12 of the connection metal members 71 and 72, an inductance (sum of L4b and part of L4a) of an interval part between the connection point with the fifth wiring line 65 and the second power supply terminal 32 in the fourth external electric wire 64, and inductances L13 and L14 of the connection metal members 73 and 74.

In the present embodiment, the snubber circuits 91 to 93 are provided, and therefore energy stored in the inductance L4a of the interval part between the connection point A4 and the negative terminal of the power source 6 in the fourth external electric wire 64 and stored in the inductance L1a of the interval part between the positive terminal of the power source 6 and the connection point A1 in the first external electric wire 61 is absorbed by the capacitor 91. As a result, the inductance Lsn that causes the generation of the surge voltage applied to the MOSFET 11 becomes equal to the sum of the inductance L1b of the interval part between the connection point A1 and the first power supply terminal 31 in the first external electric wire 61, the inductances L11, L12, L13, and L14 of the connection metal members 71, 72, 73, and 74, and the inductance L4b of the interval part between the connection point A4 and the second power supply terminal 31 in the fourth external electric wire 64. In other words, the inductance Lsn that causes the generation of the surge voltage applied to the MOSFET 11 is made much smaller than the inductance Lst caused when the snubber circuits 91 to 93 are not provided. Therefore, the surge voltage applied to the MOSFET 11 is made much smaller than when the snubber circuits 91 to 93 are not provided.

For example, when the low-side MOSFET 14 in the V-phase module 4 is turned off from a state in which the MOSFET 11 and the MOSFET 14 have been turned on, a load current flows back through a closed circuit that includes the first power supply terminal 31, the connection metal member 71, the MOSFET 11, the connection metal member 72, the output terminal 33, the seventh external electric wire 67, the U-phase field winding 8U and the V-phase field winding 8V of the electric motor 8, the eighth external electric wire 68, the output terminal 43, the connection metal member 76, the PN junction diode 13a, the connection metal member 75, the first power supply terminal 41, the second external electric wire 62, and an interval part between a connection point with the second external electric wire 62 and the first power supply terminal 31 in the first external electric wire 61.

In this example, a surge voltage (Ls·di/dt) depending on the electric current rate of change (di/dt) of the drain current of the MOSFET 14 and depending on the predetermined parasitic inductance Ls of the circuit wiring is applied to the MOSFET 14.

If the snubber circuits 91 to 93 are not provided, the inductance Lst that causes the generation of the surge voltage applied to the MOSFET 14 becomes equal to the sum of an inductance (part of L1a) between the positive terminal of the power source 6 and a connection point with the second wiring line 62 in the first external electric wire 61, inductances L17 and L18 of the connection metal members 77 and 78, an inductance (L5a+L5b) of the fifth external electric wire 65, an inductance of an interval part (part of L4a) between a connection point with the fifth external electric wire 65 and the negative terminal of the power source 6 in the fourth external electric wire 64, an inductance (L2a+L2b) of the second external electric wire member 62, and inductances L15 and L16 of the connection metal members 75 and 76.

In the present embodiment, the snubber circuits 91 to 93 are provided, and therefore energy stored in the inductance of an interval part (part of L1a) between the positive terminal of the power source 6 and a connection point with the second wiring line 62 in the first external electric wire 61, the inductance L5a of an interval part between the connection point A5 and a connection point with the fourth external electric wire 64 in the fifth external electric wire 65, the inductance of an interval part (part of L4a) between a connection point with the fifth external electric wire 65 and the negative terminal of the power source 6 in the fourth external electric wire 64, and the inductance L2a of an interval part between a connection point with the first external electric wire 61 and the connection point A2 in the second external electric wire 62 is absorbed by the capacitor 92. As a result, the inductance Lsn that causes the generation of the surge voltage applied to the MOSFET 14 becomes equal to the sum of the inductance L2b of an interval part between the connection point A2 and the first power supply terminal 41 in the second external electric wire 62, the inductances L15, L16, L17, and L18 of the connection metal members 75, 76, 77, and 78, and the inductance L5b of an interval part between the second power supply terminal 42 and the connection point A5 in the fifth external electric wire 65. In other words, the inductance Lsn that causes the generation of the surge voltage applied to the MOSFET 14 is made much smaller than the inductance Lst caused when the snubber circuits 91 to 93 are not provided. Therefore, the surge voltage applied to the MOSFET 14 is made much smaller than when the snubber circuits 91 to 93 are not provided.

When both the MOSFET 11 and the MOSFET 14 are simultaneously turned off from a state in which the MOSFET 11 and the MOSFET 14 have been turned on, a load current flows in a direction from the fourth external electric wire 64 toward the first external electric wire 61 through the fourth external electric wire 64, the second power supply terminal 32, the connection metal member 74, the PN junction diode 12a, the connection metal member 73, the output terminal 33, the seventh external electric wire 67, the U-phase field winding 8U and the V-phase field winding 8V of the electric motor 8, the eighth external electric wire 68, the output terminal 43, the connection metal member 76, the PN junction diode 13a, the connection metal member 75, the first power supply terminal 41, the second external electric wire 62, and an interval part between a connection point with the second external electric wire 62 and the positive terminal of the power source 6 in the first external electric wire 61.

In this example, most of the energy stored in the inductances parasitizing the external electric wires is absorbed by the capacitors 91 and 92. Therefore, the inductance Lsn that causes the generation of the surge voltage applied to the MOSFET 11 becomes equal to the sum of the inductance L1b, the inductances L11 to L14 (internal inductances in the U-phase module 3), and the inductance L4b. On the other hand, the inductance Lsn that causes the generation of the surge voltage applied to the MOSFET 14 becomes equal to the sum of the inductance L2b, the inductances L15 to L18 (internal inductances in the V-phase module 4), and the inductance L5b.

In other words, when either one of the MOSFETs 11 and 12 in the U-phase module 3 is turned off, the inductance Lsn (hereinafter, referred to as the inductance "$Lsn_U$" when necessary) that causes the generation of the surge voltage applied to this one becomes equal to the sum of the inductance L1b, the inductances L11 to L14 (internal inductances in the U-phase module 3), and the inductance L4b.

When either one of the MOSFETs 13 and 14 in the V-phase module 4 is turned off, the inductance Lsn (hereinafter, referred to as the inductance "$Lsn_V$" when necessary) that causes the generation of the surge voltage applied to this one becomes equal to the sum of the inductance L2b, the inductances L15 to L18 (internal inductances in the V-phase module 4), and the inductance L5b.

When either one of the MOSFETs 15 and 16 in the W-phase module 5 is turned off, the inductance Lsn (hereinafter, referred to as the inductance "$Lsn_W$" when necessary) that causes the generation of the surge voltage applied to this one becomes equal to the sum of the inductance L3b, the inductances L19 to L22 (internal inductances in the W-phase module 5), and the inductance L6b. In the present embodiment, the inductances $Lsn_U$, $Lsn_V$, and $Lsn_W$ are substantially equal to each other. Preferably, the inductances $Lsn_U$, $Lsn_V$, and $Lsn_W$ are 40 (nH) or less as described later.

In the three-phase inverter circuit 1, when the connection positions of the capacitors 91 to 93 with respect to corresponding bus bars are changed, and when the gate resistance with respect to a MOSFET is changed so that a surge voltage applied to the MOSFET that has been turned off becomes constant, the rate of change di/dt of the drain current of the MOSFET becomes greater (i.e., the falling of "di" becomes earlier) in proportion to a reduction of the inductance Lsn that causes the generation of the surge voltage applied to the MOSFET (excluding inductances by which energy stored by the snubber circuits 91 to 93 is absorbed), and therefore the switching loss caused when the MOSFET is turned off becomes smaller. Therefore, the switching loss caused when the MOSFET is turned off can be reduced by reducing the inductance Lsn that causes the generation of a surge voltage, and the surge voltage can be reduced.

In the aforementioned embodiment, one end of each of the capacitors 91, 92, and 93 is connected to the position of each of the external electric wires 61, 62, and 63 closer to the first power supply terminals 31, 41, and 51, respectively, and therefore the inductances L1b, L2b, and L3b of external electric wire parts between respective ends of the snubber circuits 91, 92, and 93 and the first power supply terminals 31, 41, and 51 can be reduced. Additionally, the other end of each of the capacitors 91, 92, and 93 is connected to the position of each of the external electric wires 64, 65, and 66 closer to the second power supply terminals 32, 42, and 52, respectively, and therefore the inductances L4b, L5b, and L6b of external electric wire parts between the respective other ends of the snubber circuits 91, 92, and 93 and the second power supply terminals 32, 42, and 52 can be reduced.

Therefore, when an arbitrary MOSFET is turned off, the inductance Lsn that causes the generation of a surge voltage applied to this MOSFET can be reduced. As a result, the switching loss at the turn-off time of the MOSFET can be reduced, and the surge voltage can be reduced.

Next, a description will be given of a relationship among the inductance Lsn that causes the generation of a surge voltage applied to a MOSFET that has been turned off, the switching loss at the turn-off time of the MOSFET, and the rate of change di/dt of a drain current.

A plurality of samples "a" to "g" having mutually different inductances Lsn were prepared. More specifically, a plurality of samples a to g having mutually different inductances Lsn were prepared by changing the distance from one end of each of the bus bars 61a, 64a, 62, 65, 63, and 66 closer to the power supply terminals 31, 32, 41, 42, 51, and 52 to the connection positions of the capacitors 91 to 93.

The distance from one end of each of the bus bars 61a, 64a, 62, 65, 63, and 66 closer to the power supply terminals 31, 32, 41, 42, 51, and 52 to the connection positions of the capacitors 91 to 93 is set so as to become longer in order of samples a, b, c, d, e, f, and g, sample "a" having the shortest distance.

With regard to sample "a," as shown in FIG. 3, both ends of each of the capacitors 91 to 93 are connected (to an A-to-B area) between one end (position A) of each of the corresponding bus bars 61a, 64a, 62, 65, 63, and 66 closer to the power supply terminals 31, 32, 41, 42, 51, and 52 and the position (position B) corresponding to the outer end of each of the power supply terminals 31, 32, 41, 42, 51, and 52. With regard to samples b to g, both ends of each of the capacitors 91 to 93 are connected to a position fixed more apart from each of the power supply terminals 31, 32, 41, 42, 51, and 52 than the position (position B) corresponding to the outer end of each of the power supply terminals 31, 32, 41, 42, 51, and 52 in the corresponding bus bars 61a, 64a, 62, 65, 63, and 66.

Therefore, the inductances L1b, L4b, L2b, L5b, L3b, and L6b become greater in order of samples a, b, c, d, e, f, and g. Therefore, the inductance Lsn that causes the generation of a surge voltage applied to a MOSFET that has been turned off becomes greater in order of samples a, b, c, d, e, f, and g.

In samples a to g, the gate resistance was adjusted so that the MOSFET 11 is turned off from a state in which the MOSFET 11 and the MOSFET 14 have been turned on and so that the surge voltage (Lsn·di/dt) applied to the MOSFET 11 reaches a predetermined value when the MOSFET 11 is turned off. After adjusting the gate resistance so that the surge voltage reaches the predetermined value, the MOSFET 11 was turned off from a state in which the MOSFET 11 and the MOSFET 14 have been turned on, and then the switching loss (mJ) at the turn-off time of the MOSFET 11 and the rate of change di/dt (A/ns) of the drain current of the MOSFET 11 were measured. In this example, the inductance Lsn that causes the generation of the surge voltage applied to the MOSFET 11 becomes equal to $Lsn_U$ (=L1b+L4b+L11+L12+L13+L14).

The power-supply voltage V was set at 600(V), and the power source electric current I was set at 100 (A). Additionally, the gate resistance was adjusted so that the surge voltage reaches 156(V).

Table 1 and FIG. 4 show measurement results.

TABLE 1

| Sample | Inductance Lsn (nH) | Switching loss (mJ) | di/dt (A/ns) |
|---|---|---|---|
| a | 27.5 | 2.90 | 4.97 |
| b | 33.4 | 6.03 | 4.67 |
| c | 34.9 | 6.49 | 4.51 |
| d | 44.3 | 7.84 | 3.52 |
| e | 55.3 | 8.85 | 2.82 |
| f | 65.8 | 9.20 | 2.37 |
| g | 80.7 | 9.67 | 1.88 |

In FIG. 4, the black triangle (▲) represents switching loss, and the white triangle (△) represents di/dt.

From Table 1 and FIG. 4, it is understood that, when the gate resistance is changed so that a surge voltage applied to a MOSFET that has been turned off becomes constant, the switching loss of the MOSFET at the turn-off time can be restricted to a low level if the inductance Lsn (in this example, $Lsn_U$) is about 40 (nH) or less.

The inductance Lsn of sample "a" is 27.5 (nH), and therefore, what is needed for setting the inductance Lsn at about 40 (nH) or less is to allow the amount of increase in the inductance Lsn to reach (40−27.5)=12.5 (nH) or less with respect to sample "a." In this example, the inductances L1b and L4b are included in the inductance $Lsn_U$, and therefore what is needed is to allow the amount of increase in L1b and in L4b to reach 6.25 (nH), which is half of 12.5 (nH), or less with respect to sample "a."

Let it be supposed that, when the capacitor 91 is connected between one end (position A) of each of the bus bars 61a and 64a closer to the power supply terminals 31 and 32 and a position (position B) nearest to the outer end of each of the power supply terminals 31 and 32, the inductances L1b and L4b of an interval part between the connection points of the capacitor 91 in the bus bars 61a and 64a and the power supply terminals 31 and 32 are constant regardless of the connection position. Additionally, let it be supposed that the inductances L1b and L4b are small in sample "a," and the inductance (L11+L12+L13+L14) in the module 3 is substantially equal to the inductance Lsn with respect to sample "a." If so, when the inductance in the module 3 is about 27.5 (nH), what is needed for setting the inductance Lsn at about 40 (nH) or less will be to set x, which determines a preferred connection range (A-to-C area S of FIG. 3) of the capacitor 91 with respect to the bus bars 61a and 64a, at 6.25 (nH) or less.

For the same reason, preferably, when the inductance in the module 4 and the inductance in the module 5 are about 27.5 (nH), the inductance $Lsn_V$ and the inductance $Lsn_W$ are set at about 40 (nH) or less. Therefore, what is needed is to set both x, which determines a preferred connection range (A-to-C area S of FIG. 3) of the capacitor 92 with respect to the bus bars 62 and 65, and x, which determines a preferred connection range (A-to-C area S of FIG. 3) of the capacitor 93 with respect to the bus bars 63 and 66, at 6.25 (nH) or less.

The present invention can be embodied in other modes although one embodiment of the present invention has been described as above. For example, each of the MOSFETs 11, 12, 13, and 14 may be a Si device that uses Si (silicon) as a semiconductor material although each is a SiC device in the aforementioned embodiment.

Additionally, the present invention can be applied also to electronic circuits other than a three-phase inverter circuit, such as an H bridge circuit although the present invention is applied to the three-phase inverter circuit as described in the aforementioned embodiment.

Besides the foregoing, various design changes can be made within the scope of the appended claims.

REFERENCE SIGNS LIST

1 Inverter circuit
3, 4, 5 Module
11 to 14 MOSFET
11a to 14a PN junction diode
31, 41, 51 First power supply terminal
32, 42, 52 Second power supply terminal
61 to 69 External electric wire
61a, 62, 63, 64a, 65, 66 Bus bar
91 to 92 Capacitor (Snubber circuit)

The invention claimed is:

1. An electronic circuit having a plurality of series circuits each of which has two metal-oxide semiconductor field-effect transistors (MOSFETs) connected in series, a first power supply terminal being connected to one end of each of the series circuits, a second power supply terminal being connected to an opposite end of each of the series circuits, the electronic circuit comprising:
   a first bus bar, one end of which is connected to each of the first power supply terminals;
   a first external electric wire comprising the first bus bar, the first external electric wire connecting the first power supply terminals to one terminal of a power source;
   a second bus bar, one end of which is connected to each of the second power supply terminals;
   a second external electric wire comprising the second bus bar, the second external electric wire connecting the second power supply terminals to an opposite terminal of the power source; and
   a snubber circuit that suppresses surge voltage, the snubber circuit being provided in each of the series circuits and connected between the first bus bar connected to the series circuits through the first power supply terminal and the second bus bar connected to the series circuits through the second power supply terminal,
wherein each of the snubber circuits includes a capacitor,
one end of each of the snubber circuits is connected to a part of the first bus bar closer to the corresponding first power supply terminal, and
an opposite end of each of the snubber circuits is connected to a part of the second bus bar closer to the corresponding second power supply terminal.

2. The electronic circuit according to claim 1, wherein, in a combination of an arbitrary one of the series circuits, the first and second power supply terminals connected to respective ends of the arbitrary one, the first and second bus bars connected thereto, and the snubber circuit connected therebetween,
a sum of an inductance of an interval part between a connection point with one end of the snubber circuit and the first power supply terminal in the first bus bar, an inductance of an interval part between a connection point with an opposite end of the snubber circuit and the second power supply terminal in the second bus bar, and an inductance of the arbitrary one between the first power supply terminal and the second power supply terminal is less than or equal to 40 nH.

3. The electronic circuit according to claim 2, wherein one end of the snubber circuit is connected between one end of the first bus bar closer to the first power supply terminal and a second position of the first bus bar located at a first predetermined distance from a first position of the first bus bar nearest to an outer end of the first power supply terminal in a direction receding from the first power supply terminal, and the first predetermined distance is set so that an inductance of a part of the first bus bar from the first position to the second position is less than or equal to 6.25 nH, and
an opposite end of the snubber circuit is connected between one end of the second bus bar closer to the second power supply terminal and a fourth position located at a second predetermined distance from a third position nearest to an outer end of the second power supply terminal in a direction receding from the second power supply terminal, and the second predetermined distance is set so that an inductance of a part of the second bus bar from the third position to the fourth position is less than or equal to 6.25 nH.

4. The electronic circuit according to claim 3, wherein each of the MOSFETs is a silicon carbide MOSFET (SiC-MOSFET) comprising a SiC semiconductor material.

5. The electronic circuit according to claim 1, wherein one end of the snubber circuit is connected between one end of the first bus bar closer to the first power supply terminal and a second position of the first bus bar located at a first predetermined distance from a first position of the first bus bar nearest to an outer end of the first power supply terminal in a direction receding from the first power supply terminal, and the first predetermined distance is set so that an inductance of a part of the first bus bar from the first position to the second position becomes is less than or equal to 6.25 nH, and
an opposite end of the snubber circuit is connected between one end of the second bus bar closer to the second power supply terminal and a fourth position located at a second predetermined distance from a third position nearest to an outer end of the second power supply terminal in a direction receding from the second power supply terminal, and the second predetermined distance is set so that an inductance of a part of the second bus bar from the third position to the fourth position is less than or equal to 6.25 nH.

6. The electronic circuit according to claim 5, wherein each of the MOSFETs is a silicon carbide MOSFET (SiC-MOSFET) comprising a SiC semiconductor material.

7. The electronic circuit according to claim 2, wherein each of the MOSFETs is a silicon carbide MOSFET (SiC-MOSFET) comprising a SiC semiconductor material.

8. The electronic circuit according to claim 1, wherein each of the MOSFETs is a silicon carbide MOSFET (SiC-MOSFET) comprising a SiC semiconductor material.

9. The electronic circuit according to claim 1, wherein the one end of each of the snubber circuits is connected to the part of the first bus bar closer to the corresponding first power supply terminal than to the power source, and
the opposite end of each of the snubber circuits is connected to the part of the second bus bar closer to the corresponding second power supply terminal than to the power source.

10. The electronic circuit according to claim 3, wherein the one end of the snubber circuit is connected between the one end of the first bus bar closer to the first power supply terminal than to the power source and the second position of the first bus bar located at the first predetermined distance from the first position of the first bus bar coincident with the outer end of the first power supply terminal in the direction receding from the first power supply terminal, and
the opposite end of the snubber circuit is connected between the one end of the second bus bar closer to the second power supply terminal than to the power source and the fourth position located at the second predetermined distance from the third position coincident with the outer end of the second power supply terminal in the direction receding from the second power supply terminal.

11. The electronic circuit according to claim 5, wherein the one end of the snubber circuit is connected between the one end of the first bus bar closer to the first power supply terminal than to the power source and the second position of the first bus bar located at the first predetermined distance from the first position of the first bus bar coincident with the outer end of the first power supply terminal in the direction receding from the first power supply terminal, and
the opposite end of the snubber circuit is connected between the one end of the second bus bar closer to the second power supply terminal than to the power source and the fourth position located at the second predetermined distance from the third position coincident with the outer end of the second power supply terminal in the direction receding from the second power supply terminal.

12. The electronic circuit according to claim 1, wherein the electronic circuit is a three-phase inverter circuit configured to drive an electric motor.

13. An electronic circuit comprising:
a series circuit including two metal-oxide semiconductor field-effect transistors (MOSFETs) connected in series;
a first power supply terminal connected to one end of the series circuit;
a second power supply terminal connected to an opposite end of the series circuit;
a snubber circuit including a capacitor, the snubber circuit being configured to suppress surge voltage;
a first bus bar, one end of which is connected to the first power supply terminal;
a first external electric wire comprising the first bus bar, the first external electric wire connecting the first power supply terminal to one terminal of a power source;

a second bus bar, one end of which is connected to the second power supply terminal; and a second external electric wire comprising the second bus bar, the second external electric wire connecting the second power supply terminal to an opposite terminal of the power source, wherein the snubber circuit is connected between the first bus bar and the second bus bar connected to the series circuit through the second power supply terminal, one end of the snubber circuit is connected to a part of the first bus bar closer to the first power supply terminal than to an opposite end of the first bus bar nearest the power source, and an opposite end of the snubber circuit is connected to a part of the second bus bar closer to the second power supply terminal than to an opposite end of the second bus bar nearest the power source.

14. The electronic circuit according to claim 13, further comprising:

a substantially rectangular parallelepiped module comprising the series circuit, the first power supply terminal, and the second power supply terminal.

15. The electronic circuit according to claim 13, wherein the electronic circuit is included in one phase of a three-phase inverter circuit.

16. The electronic circuit according to claim 13, wherein each of the MOSFETs is a silicon carbide MOSFET (SiC-MOSFET) comprising a SiC semiconductor material.

* * * * *